United States Patent
Wu et al.

(10) Patent No.: US 9,182,787 B2
(45) Date of Patent: Nov. 10, 2015

(54) REMOVABLE COVER PANEL FOR DISPLAY HOUSING

(75) Inventors: Arthur Wu, Sunnyvale, CA (US); Kevin L. Massaro, Houston, TX (US); Peter M. On, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 347 days.

(21) Appl. No.: 13/637,472

(22) PCT Filed: Jun. 25, 2010

(86) PCT No.: PCT/US2010/040041
§ 371 (c)(1),
(2), (4) Date: Sep. 26, 2012

(87) PCT Pub. No.: WO2011/162774
PCT Pub. Date: Dec. 29, 2011

(65) Prior Publication Data
US 2013/0021731 A1    Jan. 24, 2013

(51) Int. Cl.
*H05K 5/03* (2006.01)
*G06F 1/16* (2006.01)
*B23P 11/00* (2006.01)
*H05K 13/04* (2006.01)

(52) U.S. Cl.
CPC ......... *G06F 1/1637* (2013.01); *Y10T 29/49817* (2015.01); *Y10T 29/49826* (2015.01)

(58) Field of Classification Search
CPC .............................. H05K 5/03; G06F 1/1637
USPC ........... 361/679.01, 679.26; 40/787, 798, 799
See application file for complete search history.

(56) References Cited

U.S. PATENT DOCUMENTS

| | | | |
|---|---|---|---|
| 6,125,033 | A | 9/2000 | Andre et al. |
| 6,781,825 | B2 | 8/2004 | Shih et al. |
| 7,006,170 | B2 | 2/2006 | Inoue |
| 2001/0009498 | A1 | 7/2001 | Oross et al. |
| 2003/0131513 | A1* | 7/2003 | Runge .............................. 40/718 |

(Continued)

FOREIGN PATENT DOCUMENTS

| CN | 2613967 | 4/2004 |
|---|---|---|
| CN | 2641939 Y | 9/2004 |

(Continued)

OTHER PUBLICATIONS

PCT; "Notification of Transmittal of the International Search Report and the Written Opinion of the International Searching Authority, or the Declaration"; cited in PCT/US2010/040041; mailed Mar. 31, 2011; 9 pages.

(Continued)

*Primary Examiner* — Tuan T Dinh
*Assistant Examiner* — Mukund G Patel
(74) *Attorney, Agent, or Firm* — HP Legal Department (57) ABSTRACT

Embodiments of the present invention disclose a removable cover panel for a display housing. According to one embodiment, the display housing includes an electronic display device for displaying images on a front side opposite a back side and a removable cover panel that substantially spans a surface area of the back side of the display device. In addition, a flexible ring is formed around the periphery of the display device while also being configured to hold the cover panel in a fixed position on the back side of said display device.

14 Claims, 5 Drawing Sheets

(56) References Cited

U.S. PATENT DOCUMENTS

| | | |
|---|---|---|
| 2006/0044490 A1 | 3/2006 | Ichioka et al. |
| 2006/0066769 A1 | 3/2006 | Minaguchi et al. |
| 2006/0193109 A1* | 8/2006 | Bander et al. ......... 361/681 |

FOREIGN PATENT DOCUMENTS

| | | |
|---|---|---|
| CN | 1869869 | 11/2006 |
| CN | 201087983 | 7/2008 |
| CN | 201107684 | 8/2008 |
| JP | 2005017415 A | 1/2005 |
| JP | 2008203438 A | 9/2008 |

OTHER PUBLICATIONS

Office Action, CN Application No. 201080066429.0, Date: Oct. 27, 2014, pp. 1-6.

* cited by examiner

REMOVABLE COVER PANEL FOR DISPLAY HOUSING

BACKGROUND

The emergence and popularity of mobile computing has made portable electronic devices, due to their compact design and light weight, a staple in today's marketplace. Many portable electronic devices employ a clam-shell type design such as notebook computers, netbooks, tablet personal computers, and handheld devices. Generally, a clam-shell design consists of two housings connected together at a common end. The upper housing typically includes a display for presenting images and graphics to the user on one side, and a cover panel positioned on an opposite side. As the number portable electronic devices continue to increase, so does the demand to provide custom or personalized cover panels for each individual user of these devices. Moreover, the customized cover panel should be capable of simple insertion and removal so that any user, regardless of technical know-how, can confidently and efficiently perform such a task.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct electrical connection, or through an indirect electrical connection via other components and connections, such as an optical electrical connection or wireless electrical connection. Furthermore, the term "system" refers to a collection of two or more hardware and/or software components, and may be used to refer to an electronic device or devices, or a sub-system thereof.

DETAILED DESCRIPTION OF THE INVENTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Interchangeable cover panels have been commonly employed in mobile phones. In general, these cover panels are fitted to the mobile phone via snaps molded on the cover panel which allow a portion of the cover panel to snap onto the back of the mobile phone. However, such a configuration creates undesirable cosmetic issues at the areas where the snaps are molded. That is, mechanical features that assist in the interchangeable attachment of the molded snaps will be visible, thereby reducing the aesthetic quality of the portable electronic device.

Embodiments of the present invention provide a configuration for a portable electronic device that allows for a customizable cover panel to be fitted onto a display housing of the electronic device. According to one embodiment, a flexible ring holds the cover panel in a fixed position, while also functioning as a protective bumper for the front area of the display device. As such, the configuration of the present embodiments helps to solve the issue of creating interchangeable cover panels for a portable electronic device without sacrificing aesthetic quality.

Figure 1A:
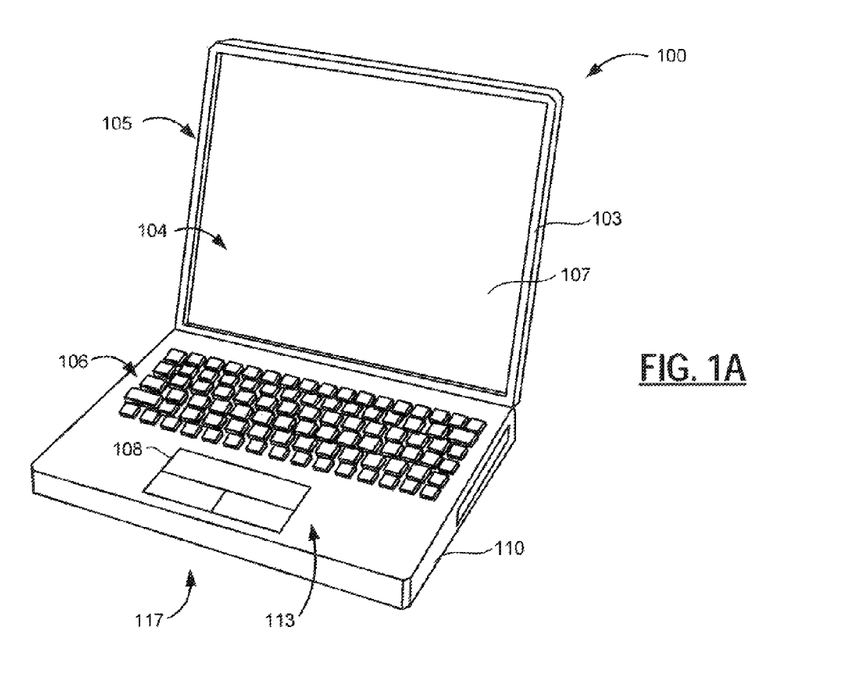
FIGS. 1A and 1B are three-dimensional perspective views of a portable electronic device according to an embodiment of the present invention.
Figure 1B:
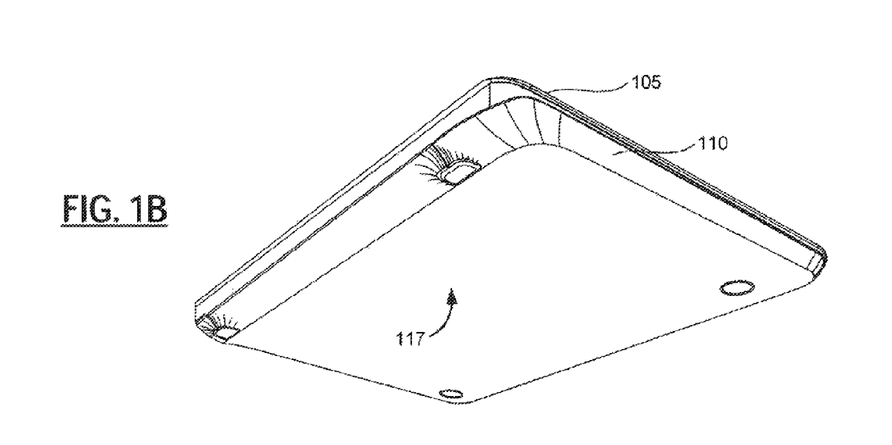

Referring now in more detail to the drawings in which like numerals identify corresponding parts throughout the views, FIGS. 1A and 1B are three-dimensional perspective views of a portable electronic device according to an embodiment of the present invention. Portable computer 100 represents the portable electronic device and includes an upper housing 105 and a base housing 110. The upper housing, or display panel housing 105, includes a display device 107 having electrical wiring adapted to provide graphical display to a user on its front surface side 104, while a flexible ring 103 is formed around the periphery thereof. The flexible ring 103 may be comprised of an elastic polymer such as rubber, neoprene, thermoplastic, or similar flexible material. As further shown in FIG. 1A, the base housing 110 includes a top surface 113 and bottom surface 117 that is opposite the top surface 113. According to one embodiment, the top surface 113 of the base housing 110 may include an input means for operation by user such as a keyboard 106 and touch pad 108.

FIG. 1B is a perspective view of a bottom surface 117 of the base housing 110 according to an embodiment of the present invention. As shown here, the base housing 110 and display panel housing 105 are in a closed position in which the display panel housing 105 is substantially aligned with the base housing 110. In particular, the front surface side 104 of the display panel housing 105 covers the front surface side (side opposite bottom surface 117) of the base housing 110 including the keyboard 106 and touchpad 108.

Figure 2:
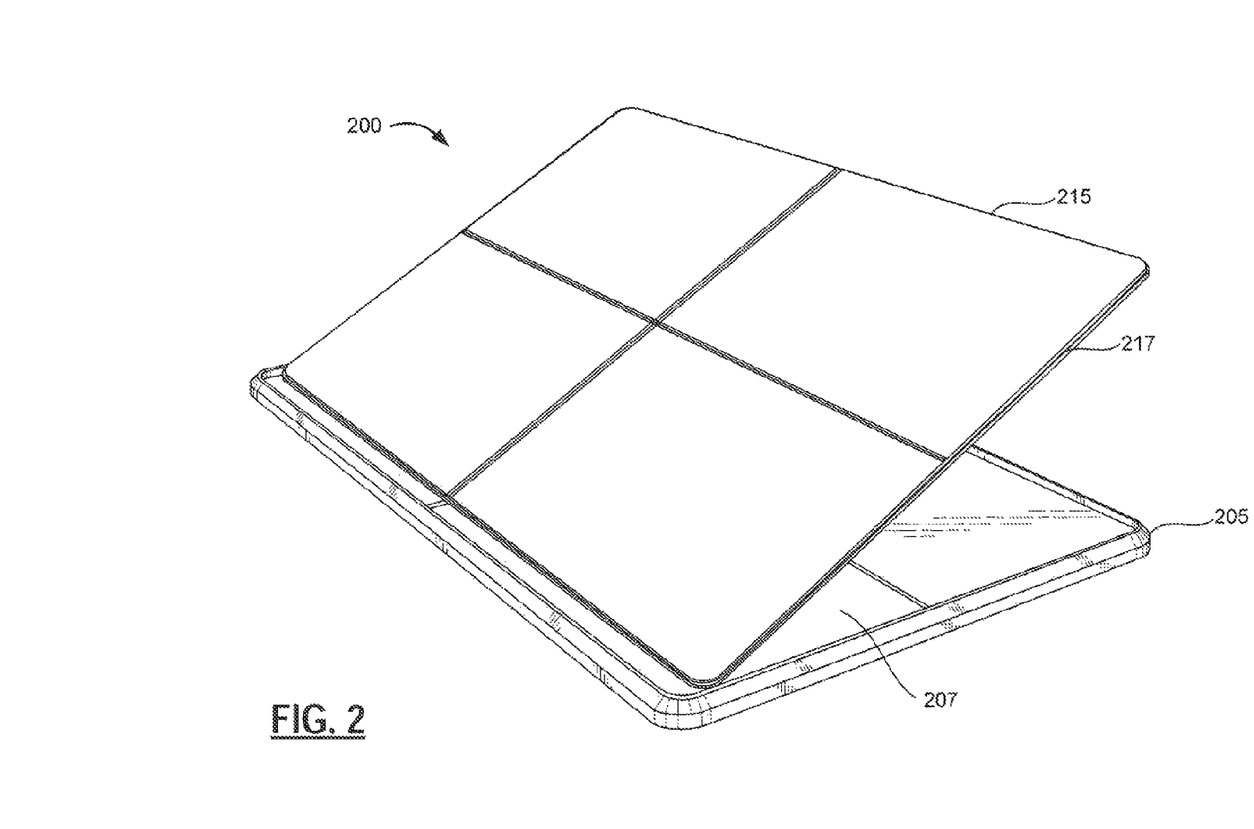
FIG. 2 is a three-dimensional perspective view of a flexible ring and removable cover panel according to an embodiment of the present invention.

FIG. 2 is a three-dimensional perspective view of a flexible ring and removable cover panel according to an embodiment of the present invention. As shown here, the display housing 200 includes a display device 207, a flexible ring 205, and a cover panel 215. According to one embodiment, the display housing 200 is molded with a flexible ring 205 formed around the periphery, or all four sides, of the display device 207. The flexible ring 205 wraps around and folds over the front and back area of the display device as will be shown in more detail with reference to FIG. 3. The cover panel 215 represents a substantially flat cosmetic sheet composed of a light and strong material such a plastic, carbon fiber, fiber glass, or the like. Still further, the cover panel 215 substantially spans an entire back side area of the display device 207, or stated differently, has a size that is approximately the same length and width as the display device 207 in order to cover the entire surface area of back side of the display device 207 when affixed thereto via flexible ring 205. In addition, the removable cover panel 215 includes an engaging portion 217 formed around its perimeter for the purpose of mating with the flexible ring 205.

Figure 3:
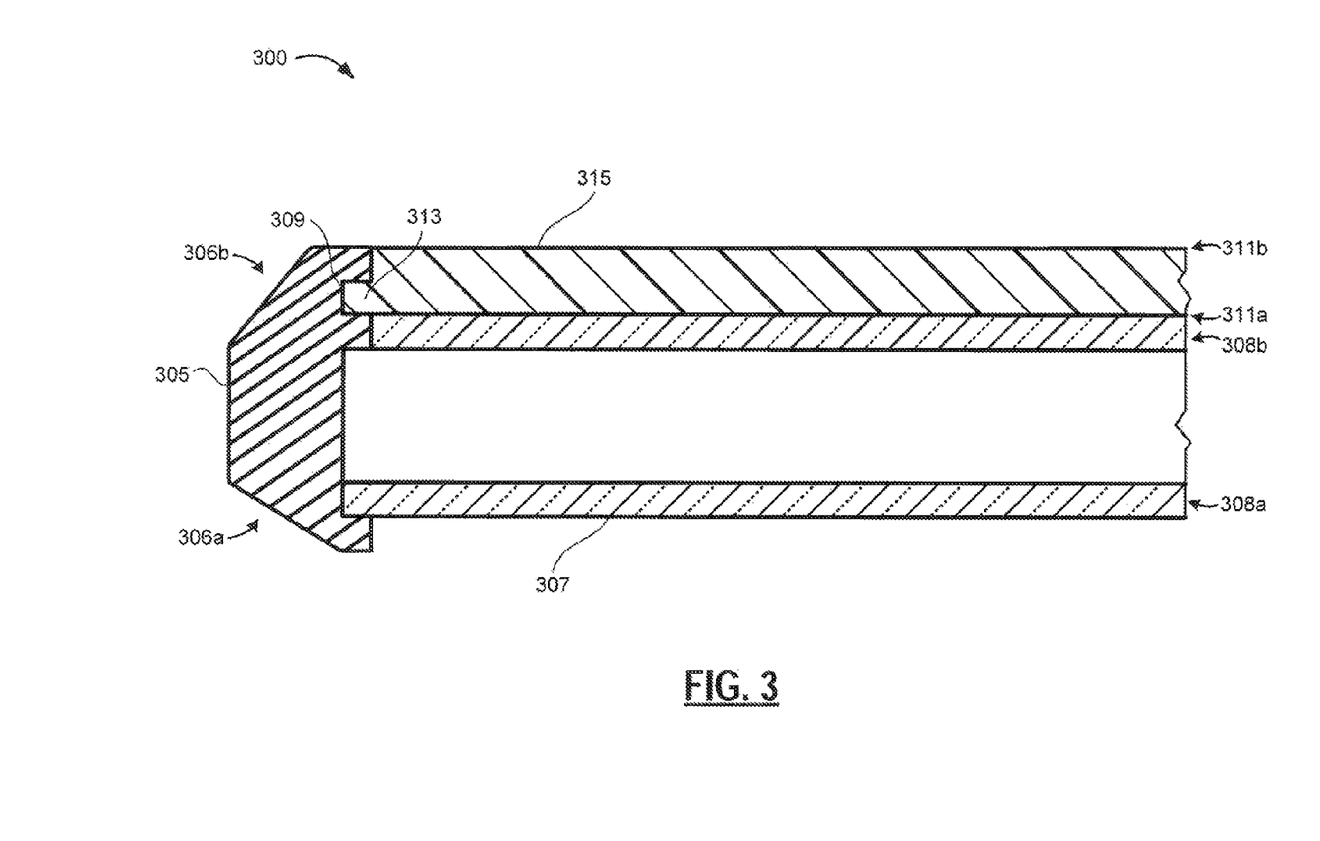
FIG. 3 is a cross-sectional view of the display housing including a removable cover panel according to an embodiment of the present invention.

FIG. 3 is a cross-sectional view of the display housing including a removable cover panel according to an embodiment of the present invention. As shown here, the display housing 300 includes a display device 307 having a front side 308a and a back side 308b opposite the front side 308a. Moreover, flexible ring 305 includes a groove portion 309 formed at a rear area 306b which is opposite the front area 306a of the flexible ring 305. In particular, the front area 306a of the flexible ring 305 wraps around a front side 308a of the display device 307, while the rear area 306b and groove portion 309 of the flexible ring 305 are utilized for receiving the engaging portion 313 of the removable cover panel 315. More specifically, the engaging portion 313 of the cover panel 315 should correspond in shape to the opening of the groove portion 309 so as to provide a secure and snug fit when the groove portion 309 and engaging portion 313 are mated together.

Furthermore, upon complete insertion (i.e. all four sides) of the cover panel 307 within the flexible ring 305, the front side 311a of the cover panel 315 abuts and substantially spans and covers the entire viewable surface area (i.e. length and width) of the back side 308b of the display device 307. Accordingly, the groove portion 309 of the flexible ring 305 is configured to hold the cover panel 315 in a fixed position on a back side 308b of the display device 307 while also permitting easy removal of the cover panel 315 from the back side 308b (as will be shown and described in more detail with reference to FIGS. 5A-5B). Moreover, the front area 306a of flexible ring 305 serves as a protective bumper for the front side 308a of the display device 307, a standard necessity for most notebook display housings. That is, the flexible ring 305 may help to prevent external contact with the front surface side 308a of the display device 307 around the perimeter thereof.

Figure 4A:
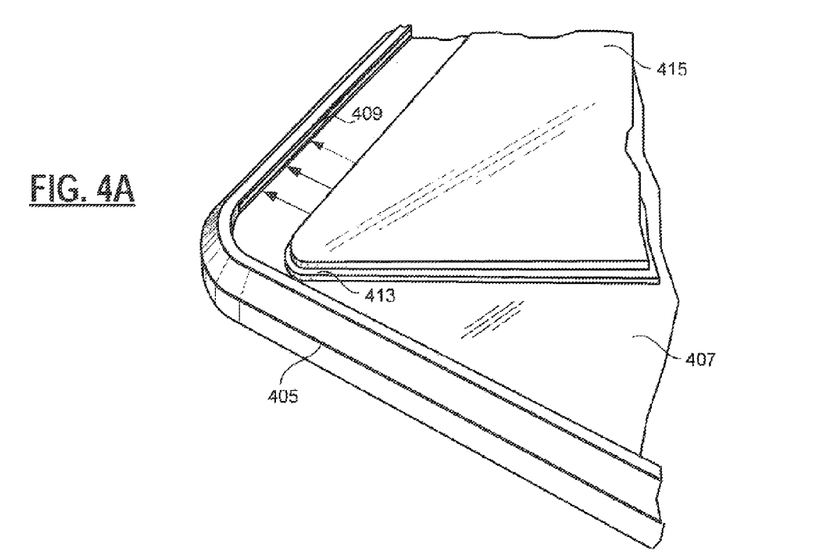
FIGS. 4A and 4B are illustrations for inserting a removable cover panel in a display housing according to an embodiment of the present invention.
Figure 4B:
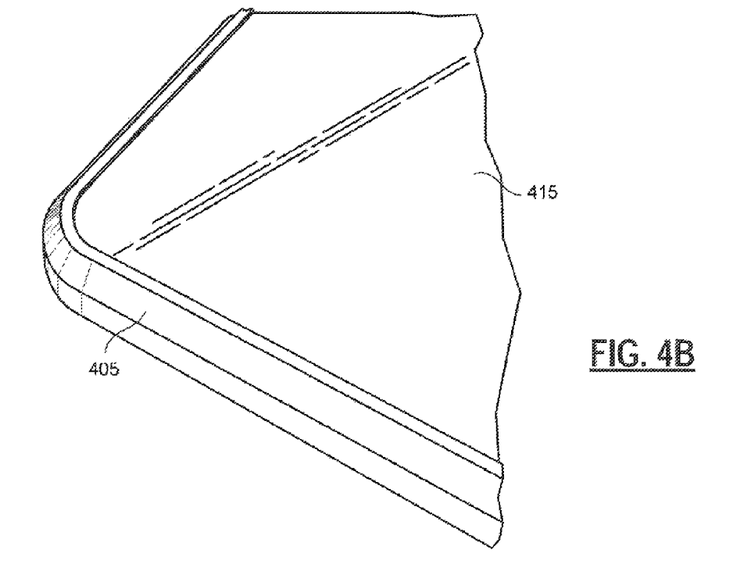

FIGS. 4A and 4B are illustrations for inserting a removable cover panel for the display housing according to an embodiment of the present invention. According to this exemplary embodiment, the back side of the display device 407 is visible to the user prior to installation or insertion of the removable cover panel 415. As indicated by the directional arrows shown in FIG. 4A, an engaging portion 413 of the removable cover panel 415 is moved into the groove portion 409 of the flexible ring 405. The cover panel 415 may be inserted at an angle with respect to the display device 407 in order to allow the engaging portion 409 of the cover panel 415 to mate completely and form a tight seal with the groove portion 409 of the flexible ring 405. When the removable cover panel 415 is completely inserted as shown in the assembled illustration of FIG. 4B, the removable cover panel 415 should abut and cover the entire back side area of the display device so that the back side of the display device 407 is no longer visible to the user.

Figure 5A:
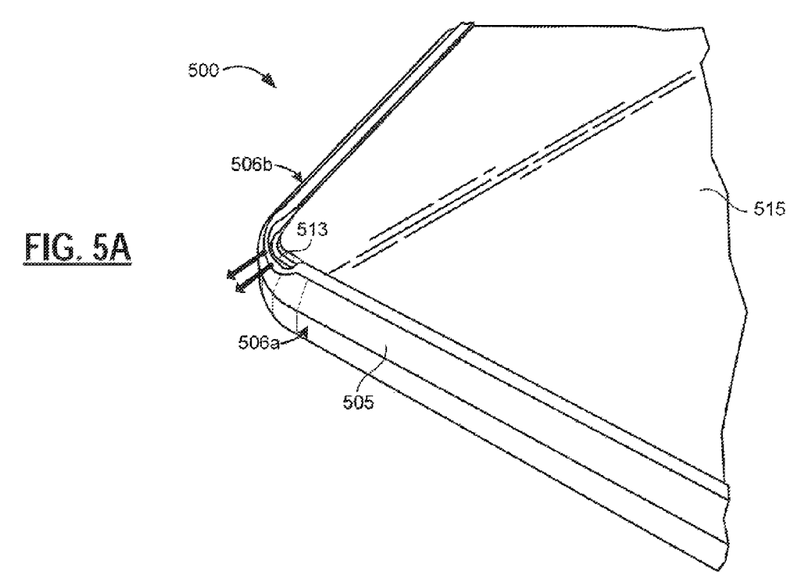
FIGS. 5A and 5B are illustrations for removing a cover panel from the display housing according to an embodiment of the present invention.
Figure 5B:
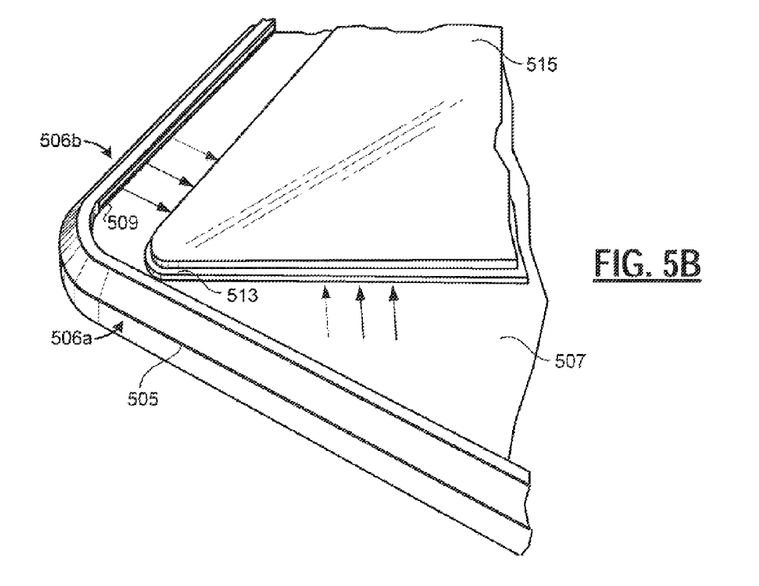

FIGS. 5A and 5B are illustrations for removing a cover panel from the display housing according to an embodiment of the present invention. In this exemplary embodiment, a corner of the flexible ring 505 is peeled, or lifted back and away from the cover panel 515 as indicated by the directional arrows. When the flexible ring is pulled or lifted back, at least a segment of the engaging portion 513 of the cover panel 515 should be exposed and visible to the user as shown in FIG. 5A. Since the ring 505 is comprised of a flexible material, the peeling or lifting back process should be easily accomplished by any user regardless of strength or technical skill level.

The user may continue to peel back the flexible ring 505 along at least two adjacent sides (e.g. 506a and 506b) of the display housing 500 until a segment of the engaging portion if visible to the user. When a desired segment (e.g. two complete sides or a single corner) of the engaging portion 513 is visible such that space is created between the engaging portion 513 and groove portion 509, the engaging portion 513 of the cover panel 515 may be safely removed from the groove portion 509 of the flexible ring 505 as shown in FIG. 5B. In one embodiment, a separate removal device such as a wedge-like tool may be utilized for peeling back the flexible ring 505 and separating the mated engaging portion 513 and groove portion 509. Thereafter, the cover panel 515 may be lifted and removed from the back side of the display as shown in FIG. 5B.

Embodiments of the present invention provide a removable cover panel for a display housing. In particular, the embodiments disclose a flexible ring formed around the periphery of a display device. The flexible ring serves a dual function in affixing the cover panel to the display device while also protecting a front surface side of the display device. Still further, the flexible ring in accordance with embodiments of the present invention thus allows a removable cover panel to be inserted and removed from the display housing quickly and effortlessly.

Furthermore, several advantages are afforded by the removable cover panel and display housing of the present embodiments. For example, the number of assembled parts are reduced by eliminating latching mechanisms and snapping features used in the manufacture of conventional interchangeable panels for portable devices having a display housing. Furthermore, the configuration in accordance with embodiments of the present invention allows for the formation of a display housing with a minimum number of break lines and obtrusions on the surface thereof, thereby reducing manufacturing costs and simplifying assembly.

In addition, while the invention has been described with respect to exemplary embodiments, one skilled in the art will recognize that numerous modifications are possible. For example, although exemplary embodiments depict a notebook computer as the portable electronic device, the invention is not limited thereto. For example, the portable electronic device may be a netbook, a tablet personal computer, a cell phone, or any other electronic device having a clam shell housing arrangement.

Furthermore, the engaging portion may only be formed on certain segments of the cover panel as opposed to the entire perimeter of the cover panel as described in the embodiments discussed above. For example, engaging portions may be formed on only the corners of the cover panel or Bear a central area of two or more sides of the cover panel. Thus, although the invention has been described with respect to exemplary embodiments, it will be appreciated that the invention is intended to cover all modifications and equivalents within the scope of the following claims.

What is claimed is:

1. A display housing for a portable electronic device, the display housing comprising:
an electronic display device for displaying images on a front side opposite a back side;

a removable cover panel that substantially spans an entire surface area of the back side of the display device;

a flexible ring formed around the periphery of the display device;

wherein the flexible ring comprises a first groove running around an interior perimeter of the flexible ring, an edge of the electronic display being received in the first groove such that a portion of the flexible ring extends over a portion of both the front and back opposite sides of the electronic display device, and a second groove running around the interior perimeter of the flexible ring and opening in a direction parallel to the surface area of the back side of the display device, an edge of the removable cover panel being received in the second groove to hold the cover panel in a fixed position on the back side of the display device.

2. The display housing of claim 1, wherein the flexible ring.

3. The display housing of claim 1, wherein the flexible ring is formed of thermoplastic.

4. The display housing of claim 1, wherein the cover panel includes an engaging portion formed around a perimeter thereof, the engaging portion being less thick than a thickness of the cover panel and sized to be received in the second groove.

5. The display housing of claim 4, wherein the cover panel is held in a fixed position with the flexible ring and display housing when the entire engaging portion of the cover panel is inserted into the groove portion of the flexible ring.

6. The display housing of claim 4, wherein the engaging portion of the cover panel has a shape corresponding to an interior shape of the second groove.

7. The display housing of claim 1, wherein the flexible ring is comprised of a rubber material.

8. A portable electronic device comprising:

a display housing pivotably connected to a base housing, wherein the display housing includes an electronic display device for displaying images on a front side opposite a back side;

a removable cover panel that substantially spans the back side of the display device; and a flexible ring formed around the periphery of the display device;

wherein the flexible ring comprises a first groove running around an interior perimeter of the flexible ring, an edge of the electronic display being received in the first groove such that a portion of the flexible ring extends over a portion of both the front and back opposite sides of the electronic display device, and a second groove running around the interior perimeter of the flexible ring and opening in a direction parallel to the surface area of the back side of the display device, an edge of the removable cover panel being received in the second groove to hold the cover panel in a fixed position on the back side of the display device.

9. The portable electronic device of claim 8, wherein the flexible ring entirely encloses the edge of the electronic display device.

10. The portable electronic device of claim 8, wherein the flexible ring is formed of thermoplastic.

11. The portable electronic device of claim 8, wherein the cover panel includes an engaging portion formed around a perimeter thereof, the engaging portion being less thick than a thickness of the cover panel and sized to be received in the groove portion.

12. The portable electronic device of claim 11, wherein the cover panel is held in a fixed position with the flexible ring and display housing when the entire engaging portion of the cover panel is inserted into the groove portion of the flexible ring.

13. The portable electronic device of claim 11, wherein the engaging portion of the cover panel has a shape corresponding to an interior shape of the second groove.

14. The portable electronic device of claim 8, wherein the flexible ring is comprised of a rubber material.

* * * * *

UNITED STATES PATENT AND TRADEMARK OFFICE
CERTIFICATE OF CORRECTION

PATENT NO.          : 9,182,787 B2                                       Page 1 of 1
APPLICATION NO.     : 13/637472
DATED               : November 10, 2015
INVENTOR(S)         : Arthur Wu et al.

It is certified that error appears in the above-identified patent and that said Letters Patent is hereby corrected as shown below:

In The Claims
In column 5, line 18 approx., in Claim 2, delete "ring." and insert -- ring is formed of neoprene. --, therefor.

Signed and Sealed this
Fifth Day of April, 2016

Michelle K. Lee
*Director of the United States Patent and Trademark Office*